Nov. 26, 1957  R. M. GLANTZER  2,814,713
WELDING MACHINE FOR WIRE FABRICS
Filed Oct. 30, 1956  14 Sheets-Sheet 1

Fig. 1.

INVENTOR.
RUSSELL M. GLANTZER
BY
his
ATTORNEY.

Nov. 26, 1957 R. M. GLANTZER 2,814,713
WELDING MACHINE FOR WIRE FABRICS
Filed Oct. 30, 1956 14 Sheets-Sheet 2

Fig. 2.

INVENTOR.
RUSSELL M. GLANTZER.
BY Archworth Martin
his ATTORNEY.

Nov. 26, 1957 R. M. GLANTZER 2,814,713
WELDING MACHINE FOR WIRE FABRICS
Filed Oct. 30, 1956 14 Sheets-Sheet 3

Fig. 3.

INVENTOR.
RUSSELL M. GLANTZER.
BY
his ATTORNEY

Nov. 26, 1957   R. M. GLANTZER   2,814,713
WELDING MACHINE FOR WIRE FABRICS
Filed Oct. 30, 1956   14 Sheets-Sheet 4

INVENTOR.
RUSSELL M. GLANTZER.
BY
his
ATTORNEY.

Nov. 26, 1957 R. M. GLANTZER 2,814,713
WELDING MACHINE FOR WIRE FABRICS
Filed Oct. 30, 1956 14 Sheets-Sheet 5

INVENTOR.
RUSSELL M. GLANTZER.
BY Archworth Martin
his
ATTORNEY.

Nov. 26, 1957  R. M. GLANTZER  2,814,713
WELDING MACHINE FOR WIRE FABRICS
Filed Oct. 30, 1956  14 Sheets-Sheet 7

Fig. 10 A.

INVENTOR.
RUSSELL M. GLANTZER.
BY Archworth Martin
his ATTORNEY

Fig. 20.

INVENTOR.
RUSSELL M. GLANTZER
BY
his ATTORNEY

Nov. 26, 1957 R. M. GLANTZER 2,814,713
WELDING MACHINE FOR WIRE FABRICS
Filed Oct. 30, 1956 14 Sheets-Sheet 10

Fig. 21

INVENTOR.
RUSSELL M. GLANTZER.
BY
his ATTORNEY

Fig. 22.

INVENTOR.
RUSSELL M. GLANTZER
BY [signature]
his ATTORNEY

Nov. 26, 1957 R. M. GLANTZER 2,814,713
WELDING MACHINE FOR WIRE FABRICS
Filed Oct. 30, 1956 14 Sheets-Sheet 13

Fig. 27.

INVENTOR.
RUSSELL M. GLANTZER
BY Ashworth Martin
his ATTORNEY

United States Patent Office 2,814,713
Patented Nov. 26, 1957

2,814,713
WELDING MACHINE FOR WIRE FABRICS

Russell M. Glantzer, Washington, Pa., assignor to Tri-State Engineering Company, Washington, Pa., a corporation of Maryland Application October 30, 1956, Serial No. 619,322

7 Claims. (Cl. 219—56)

My invention relates to welding machines for the making of wire fabrics such as are suitable for use as crates; fork-lifting pallets; fencing; concrete reinforcement; etc. The invention relates primarily to the manner in which the wire strands or rods are supplied to the welding electrodes in either the usual 2-layer arrangement or with a third layer of reinforcing wires for strengthening the mesh produced by the longitudinal and transverse wires of the two conventional layers of wire.

One object of my invention is to provide feeding apparatus for the transverse wires which will accurately place them in crosswise position between upper and lower welding electrodes and which, as they are fed in, will automatically effect energization of the electrodes and movement thereof to and from welding engagement with the crossed wires, and which will also set in motion indexing or feeding mechanism which will operate to advance the strand wires and the mesh step-by-step through the welding machine.

Another object of my invention is to provide means for automatically controlling the spacing between the transverse wires so that they will be located at adjustably desired distances apart, and which can be automatically spaced and welded in recurrent patterns, so that a desired number of transverse wires can be spaced one inch apart or less, if desired, followed by a desired number of wires more widely spaced and with automatic recurrence to the first spacing.

Still another object of my invention is to provide an improved means for applying a third set of wires to the mesh, by an additional group of electrodes, in timed relation to the first.

Some of the forms which my invention may take are shown in the accompanying drawings wherein.

The machine is designed for welding the wire mesh that comprises longitudinal wires 10 and transverse wires 11 that are welded to the undersides of the wires 10 to form the mesh which, as stated above, can be used for various purposes such as walls and bottoms of containers, concrete reinforcement, fencing, etc. The longitudinal wires are drawn from reels (not shown) at the rear of the machine, by pulling devices at the front of the machine which engage the wires 11 intermittently to pull the fabric forward step-by-step, after successive welds, thus also pulling the wires 10 from their reels.

Figure 8:
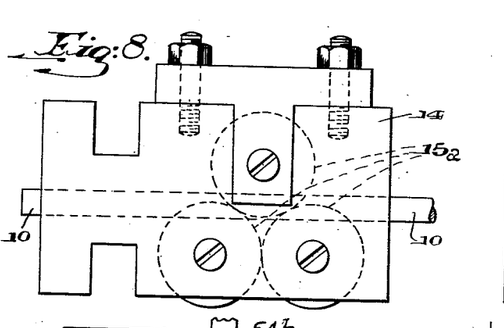
Fig. 8 is an enlarged view showing the straightening rollers for the longitudinal wires.
Figure 9:
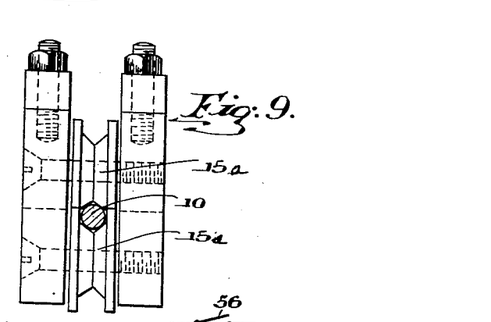
Fig. 9 is an edge view thereof.

The wires 10 are first threaded through guide blocks 12 and then through guides 13 which also serve as tensioning devices to maintain some tautness on the wires, particularly at the vicinity of the electrodes. Tensioning blocks 14 are adjustable by bolts and nuts at 14a, to adjust straighteners 15a (Fig. 8) and to control tension or drag on the wires and also to accommodate the guides to various gauges of wires.

Figure 5:
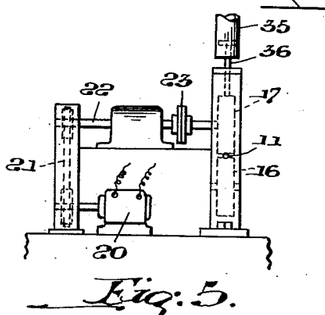
Fig. 5 is a face view of the apparatus of Fig. 4.

The transverse or stay wires 11 are fed crosswise of the wires 10, these transverse wires being drawn past straightening rolls 15 of conventional form. The pulling force on these wires is exerted by pinch rolls 16 and 17. The roll 16 is continuously driven by a motor 20 (Fig. 5) through a chain drive 21 and a shaft 22 which is connected to the roll shaft by a coupling 23.

The transverse wire 11 is fed through stationary fingers 18 and 18a (Figs. 2 and 11 to 14) that are fixedly mounted on a bar 18c that forms part of the framework of the machine. Spring-pressed pivoted fingers 18b yieldably hold these transverse wires in place until they are picked up by the magnetic fingers hereinafter described and thereby moved up into welding position upon the first electrode bar and beneath the first row of vertically-movable electrodes.

Figure 3:
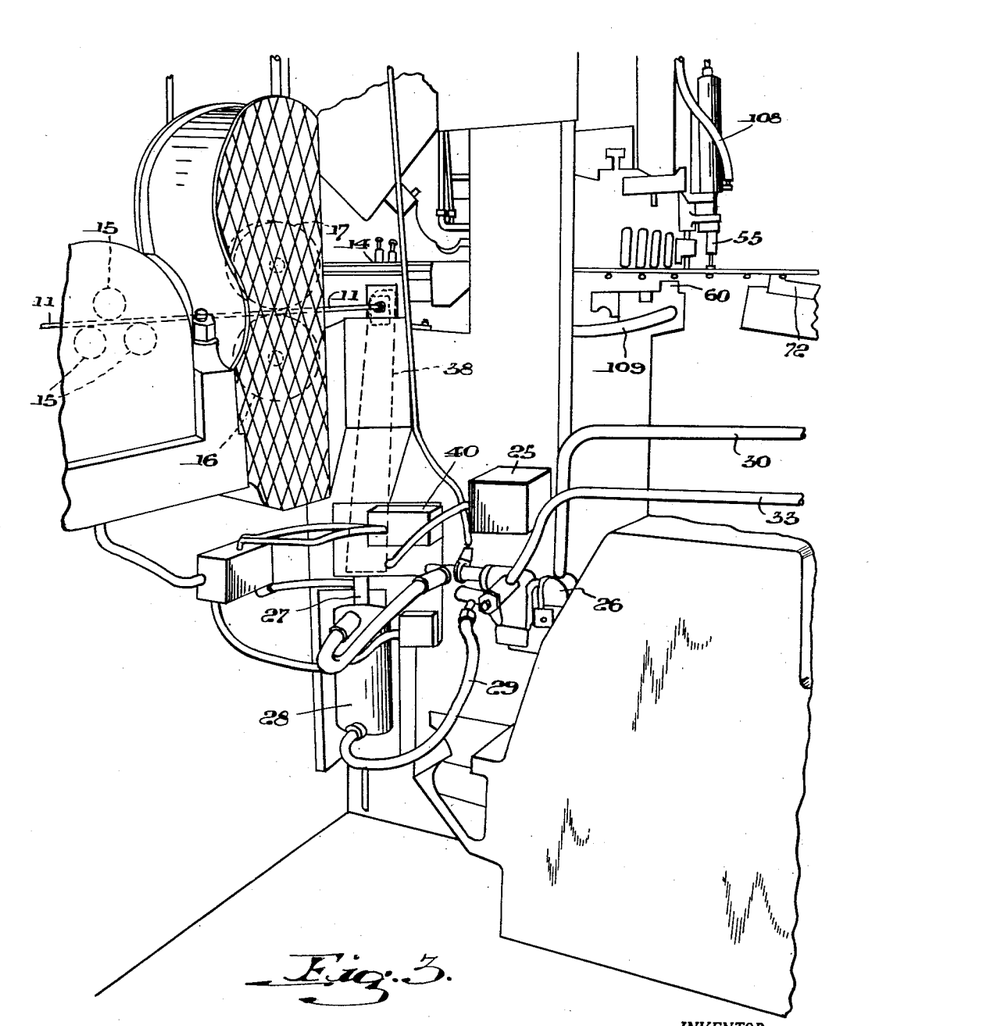
Fig. 3 is a side view, in perspective, of a portion of the machine where the transverse wires and stay wires are fed into it.
Figure 4:
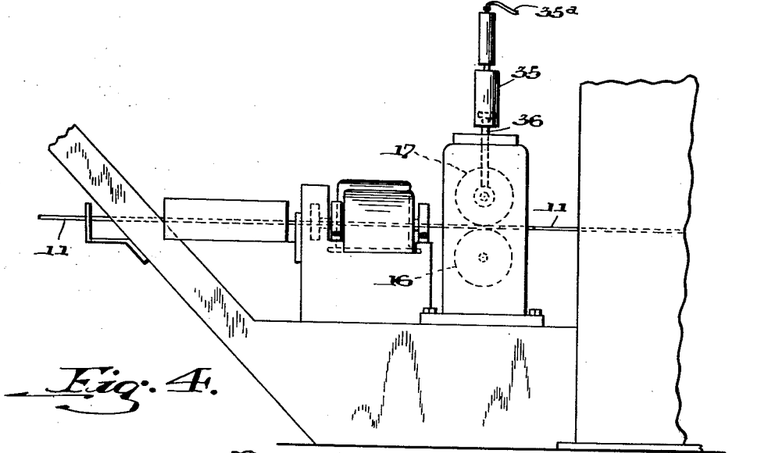
Fig. 4 is an enlarged view of a portion of the transverse wire feeding apparatus of Fig. 3.
Figures 6, 7:
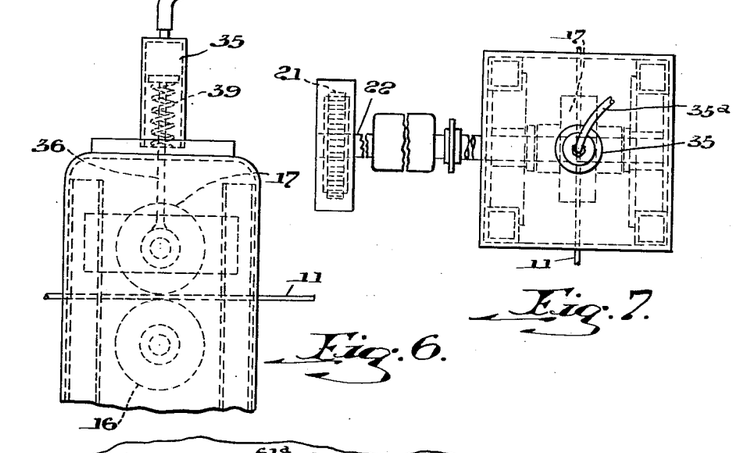
Fig. 6 is an enlarged view of a portion of the feeding apparatus of Fig. 4.
Fig. 7 is a plan view of the apparatus of Fig. 5.

When a transverse wire 11 has been advanced by the feed rolls 16—17 to a point where it extends completely across the undersides of the longitudinal wires 10, the end thereof will engage the movable contact member of a switch 24 to close a circuit from the power line through a solenoid 25 (Figs. 3 and 28) that operates a 4-way valve 26. The valve 26 controls flow and exhaust of fluid pressure to a cylinder 35 (Figs. 3, 4, 28) through pipes 35, whose piston rod 36 is connected to the bearing of the upper feed roll 17, to force the same downwardly, into driving engagement with the wire 11. A spring 39 (Fig. 6) holds the roll 17 raised slightly when there is no fluid pressure in the cylinder 35.

The valve 26 then admits fluid pressure to the underside of a piston 27 in a cylinder 28, through a pipe 29 that has communication with a discharge pipe 30 of a hydraulic pump 31 which is driven by a motor 32. This pushes a shear knife 38 (Fig. 3) upwardly to cut off a transverse wire. The upper end of the cylinder is, at this time, in communication through pipe 33 with the intake pipe 34 of the pump.

The valve 26 is normally in position to admit fluid pressure from the line 29 to the upper side of the piston 27, and it will automatically return to this normal position after de-energization of the solenoid 25 through the opening of the switch 24 and the placing of the upper and lower ends of the cylinder 28 in communication with the intake and output sides of the pump.

Figure 15:
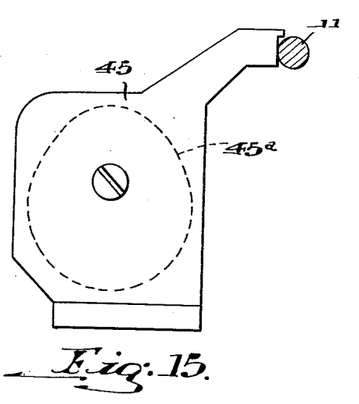
Fig. 15 is an enlarged face view of one of the magnetic feeding fingers of Figs. 2 and 10.
Figure 16:
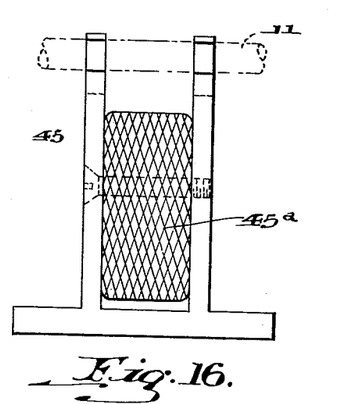
Fig. 16 is an edge view thereof.

The piston rod in the cylinder 28 at the end of its upward movement closes a switch 40 (Fig. 28) which, through a relay 41, will close a circuit to a 4-way hydraulic valve 43. The switch also closes a circuit through a relay 44 which will set up a current flow to coils 45a of feed fingers 45 (Figs. 15–16) so as to magnetize such fingers and thereby cause them to hold the cut-off transverse wire with some force, while the transverse wire is being moved by the fingers into position beneath the first row of welding electrodes.

Figure 10:
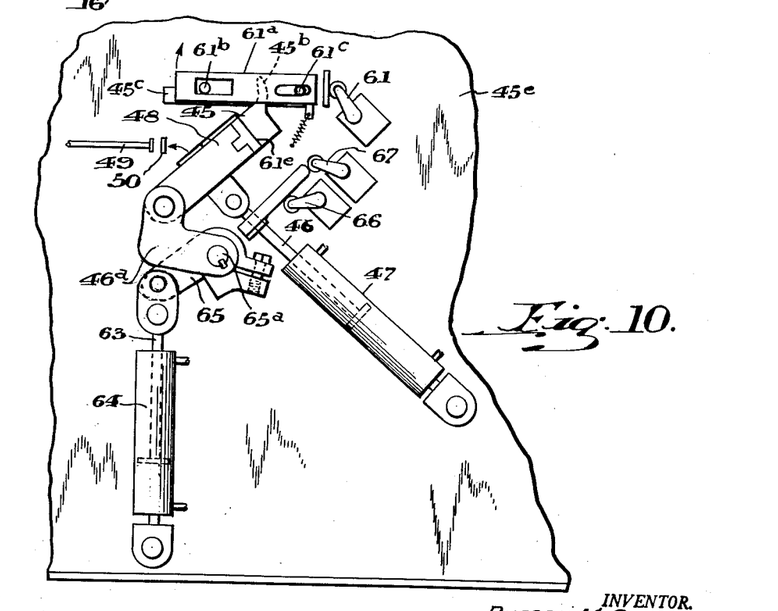
Figs. 10 and 10A are views of a portion of the apparatus of Fig. 2, showing mechanism for feeding the transverse wires into position between the electrodes and beneath the longitudinal wires.
Figure 10A:
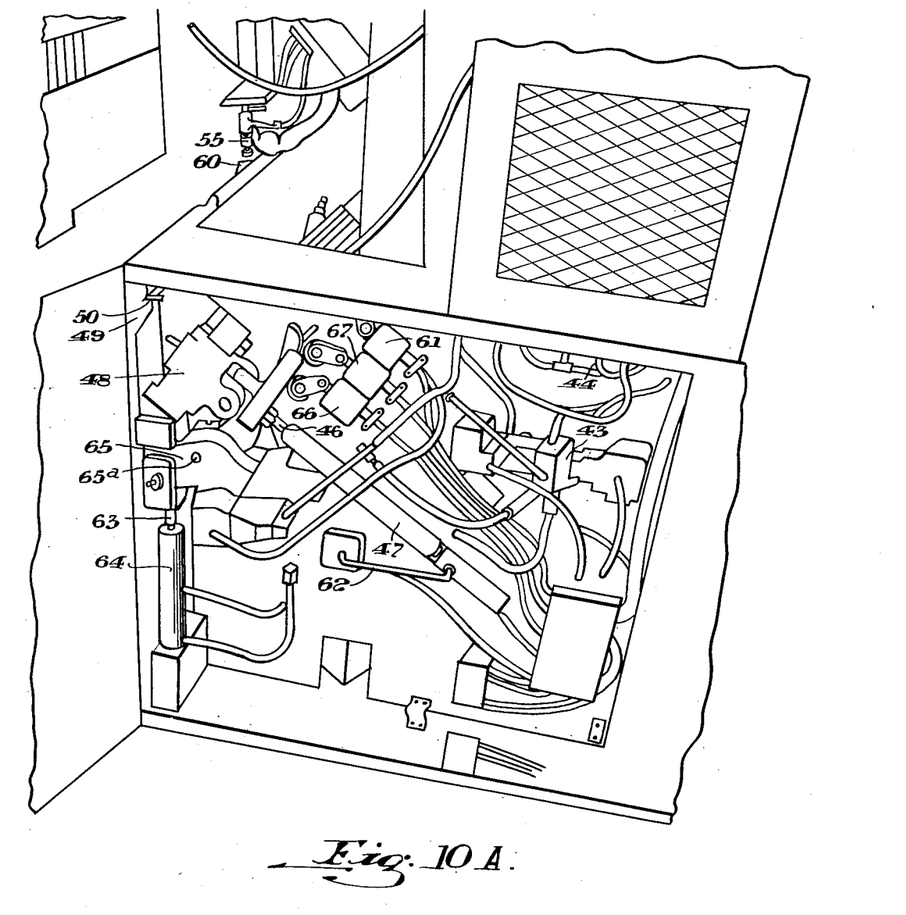
Figure 11:
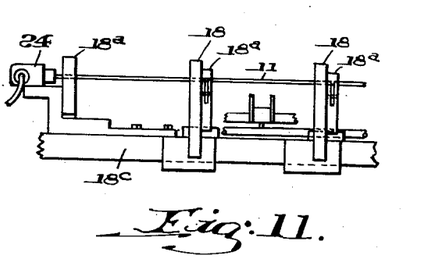
Fig. 11 is a fragmentary face view thereof.
Figures 12, 13, 14:
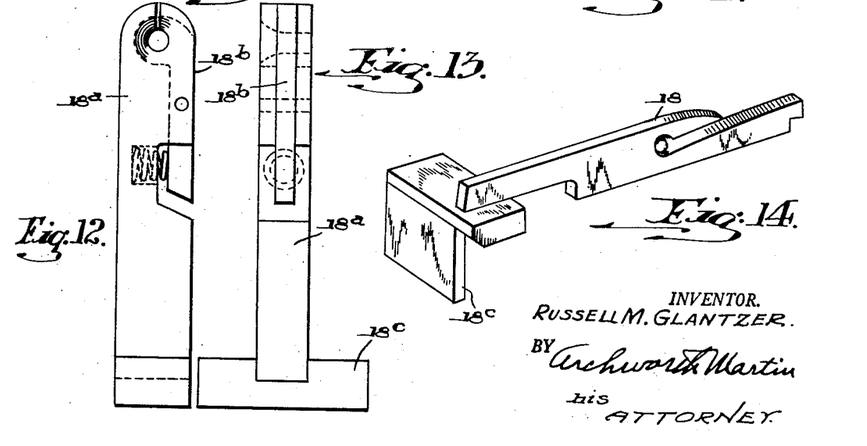
Figs. 12 and 13 are enlarged side and edge views respectively, of one of the stationary retaining fingers into which the transverse wires are fed preparatory to moving them into position between the electrodes.
Fig. 14 is a perspective view of other stationary guides for the transverse wires when they are first fed into the machine, preparatory to being moved up to the electrodes.

When the relay 41 closes a circuit from the power line through the solenoid of the 4-way hydraulic valve 43, this valve operates to cause a piston rod 46 to be moved out of its cylinder 47 (Fig. 10). This piston rod is pivotally connected through a crank arm 65, a rock shaft 65a and an angular crank arm 46a, to a bracket 48 on which the magnetic fingers 45 are mounted. The bell crank lever 46a is pivoted to 48 and rigidly connected to the rock shaft 65a. As the piston rod 46 moves out of the cylinder 47, it will raise the bracket 48. When the bracket 48 reaches its raised position, it closes a limit switch 67, and if there is a transverse wire in the machine at that time, the limit switch 67 upon closing the circuit on the hydraulic valve 43 will admit pressure into cylinder 47, to swing the bracket 48 forwardly and thus move the magnetic fingers to lift the wire into position between a lower electrode and the first row of upper electrodes.

Figure 18:
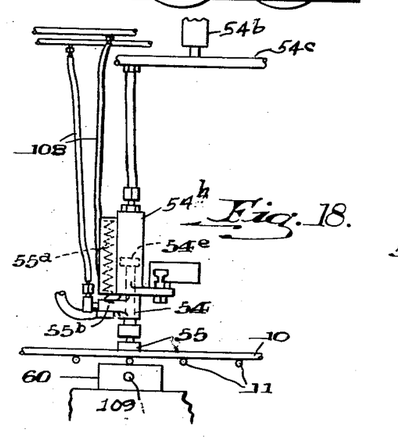
Fig. 18 is a side view showing one of the upper electrodes in welding position upon the wires and the lower electrode bar.
Figure 19:
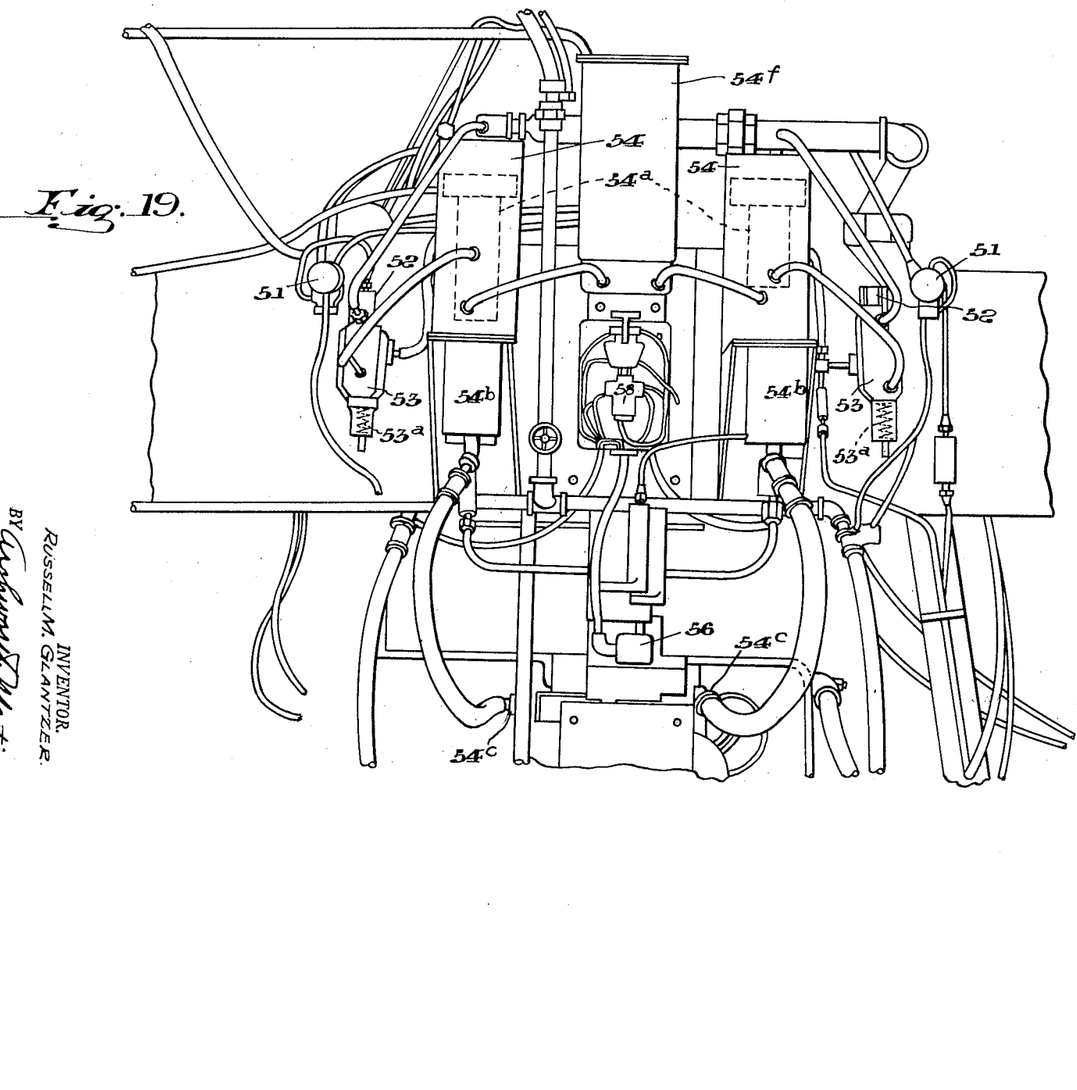
Fig. 19 is a side view showing certain of the piping arrangements and their relation to the upper welding electrodes.
Figure 28:
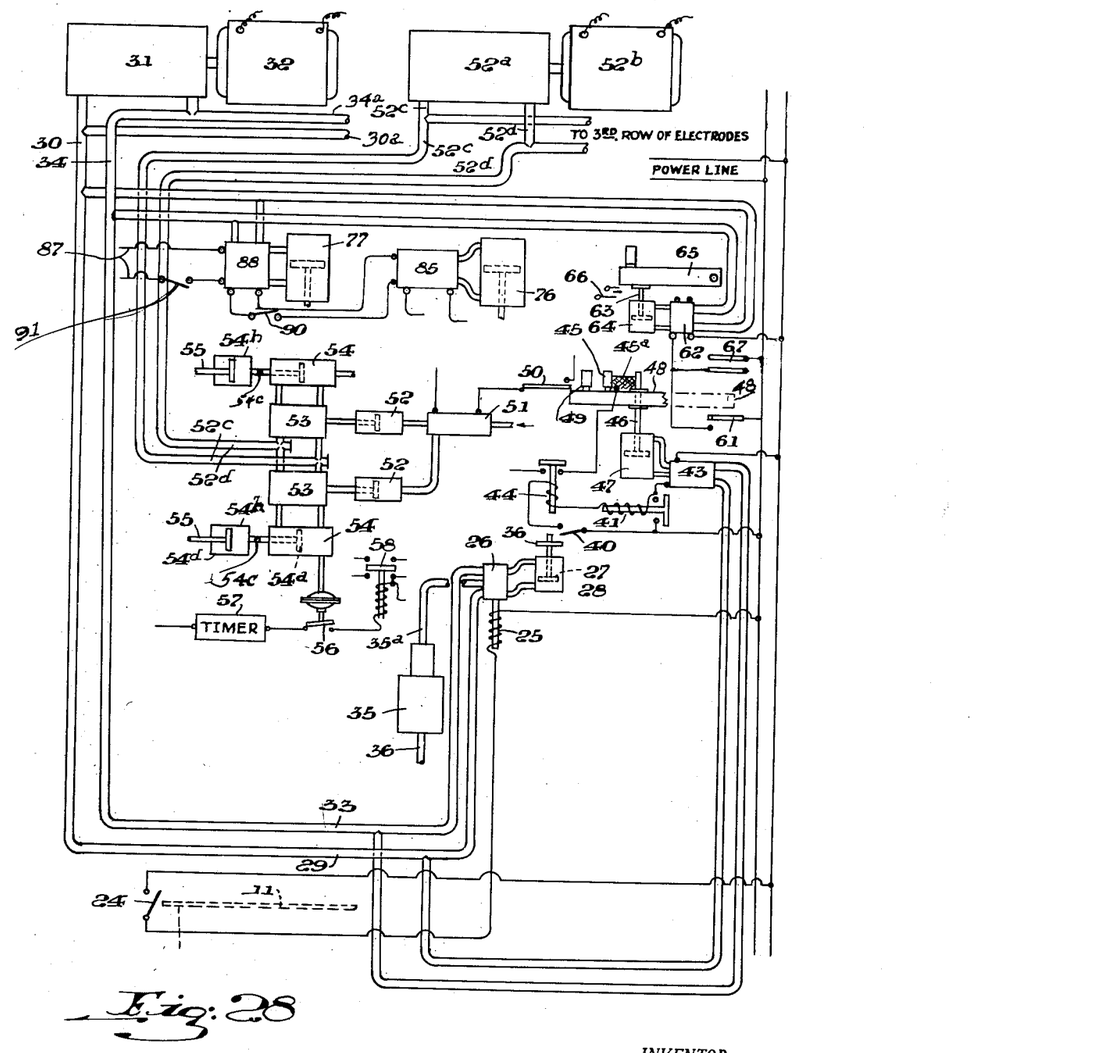
Fig. 28 is a wiring diagram of the piping and electrical controls for the operations.

When the bracket 48 hits a stop 49 (Fig. 28), it also engages a switch 50 which closes a circuit from the power line through the solenoid of a 2-way air valve 51 that is supplied with air under pressure from a suiable source (Figs. 19 and 28). Air will thereby be directed to two cylinders 52 whose pistons will move downwardly against their springs 53a (Fig. 19). Two 4-way hydraulic valves 53 control flow of oil from a pump 52 that is driven by a motor 52b. This oil is directed through a pump outlet pipe 52c, the return line to the pump being designated 52d. The pipes 52c and 52d are connected to the hydraulic valves 53, these valves serving to direct the fluid pressure to opposite sides alternately of pistons in the booster cylinders 54 (Figs. 18—19—28). Pressure against the upper enlarged ends of the pistons 54a in cylinders 54 forces the pistons downwardly, bringing their reduced ends into cylindrical extensions 54b, thereby forcing the oil through header pipes 54c into the various cylinders of the welding guns 54h. The oil pressure in 54h operates against a piston 54e (Fig. 13) to force the electrodes 55 downwardly to welding position. A spring 55a connected to an arm 55b that carries the electrode 55 pulls the electrode and the piston 54e upwardly, when pressure is released at the booster 54, the oil at the upper sides of the booster 54 being then returned through valves 53 to the intake line 52d of the pump 52a.

Oil beneath the lower end of the piston 54a and into the cylinder 54b will be automatically replenished by gravity flow from a tank 54f each time air pressure is released from the cylinder 54 by the valve 51 and the piston 54a rises to its full height.

Because lighter hydraulic pressure is required for operating the electrodes, the oil pump 52a is provided independently of the main hydraulic pump 31.

Figure 17:
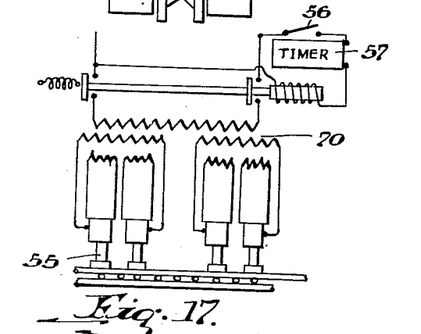
Fig. 17 is a diagrammatic view showing the transformers for the upper welding electrodes.

A timer (Figs. 17 and 28) may suitably be of the electronic type, in the circuit of a reverse relay 58, or it may be of the type shown in Patent No. 1,932,119, issued October 24, 1933, wherein a slow-acting electro-magnet for interrupting the welding circuit is energized simultaneously with the closing of the welding circuit.

The pressure is maintained on each row of electrodes 55 and the timer switch limits the duration of the flow of welding current from one of the electrodes through the longitudinal wire 10 and the transverse wire 11 and along the copper electrode bar 60 and then upwardly through the wires 11 and 10 to the other electrode of the pair. The timing device serves, of course, to prevent overheating or burning of the welds.

When the reverse relay 58 reaches its last-named position, it opens the magnetic circuit for one side of the 4-way hydraulic valve 43 and closes the circuit for the other side thereof. This will cause the piston rod 46 to retract into its cylinder 47 and thereby return the swinging bracket 48 to its rearward position, thus removing the fingers from the transverse wire which will, in the meantime, have been engaged by the electrodes and welded to some longitudinal wires.

During its backward movement, the bracket 48 will become engaged with a slide bar 61a that is slidable on studs 61b and 61c to close the limit switch 61, thus closing a circuit through the solenoid hydraulic 4-way valve 62. The upper end (45b) of the finger 45 shown on Fig. 10, that operates the slide bar and the switch 61, is offset laterally and extends through a slot 45c in the plate 45e of the machine frame. Actuation of the slide bar against spring tension is effected by a shoulder 61e on the bracket 48 engaging with the forward end of the bar 61 and snapping backwardly past such end when the switch has been actuated.

At the end of backward movement by the bracket, limit switch 66 is closed, to direct fluid pressure into the lower side of the cylinder 64, to again raise the bracket. This raising movement results in closure of the switch 67 to admit pressure to the lower end of cylinder 47, if there is a transverse wire in position to close the switch 24, thereby repeating a stay wire feeding operation.

Figure 2:
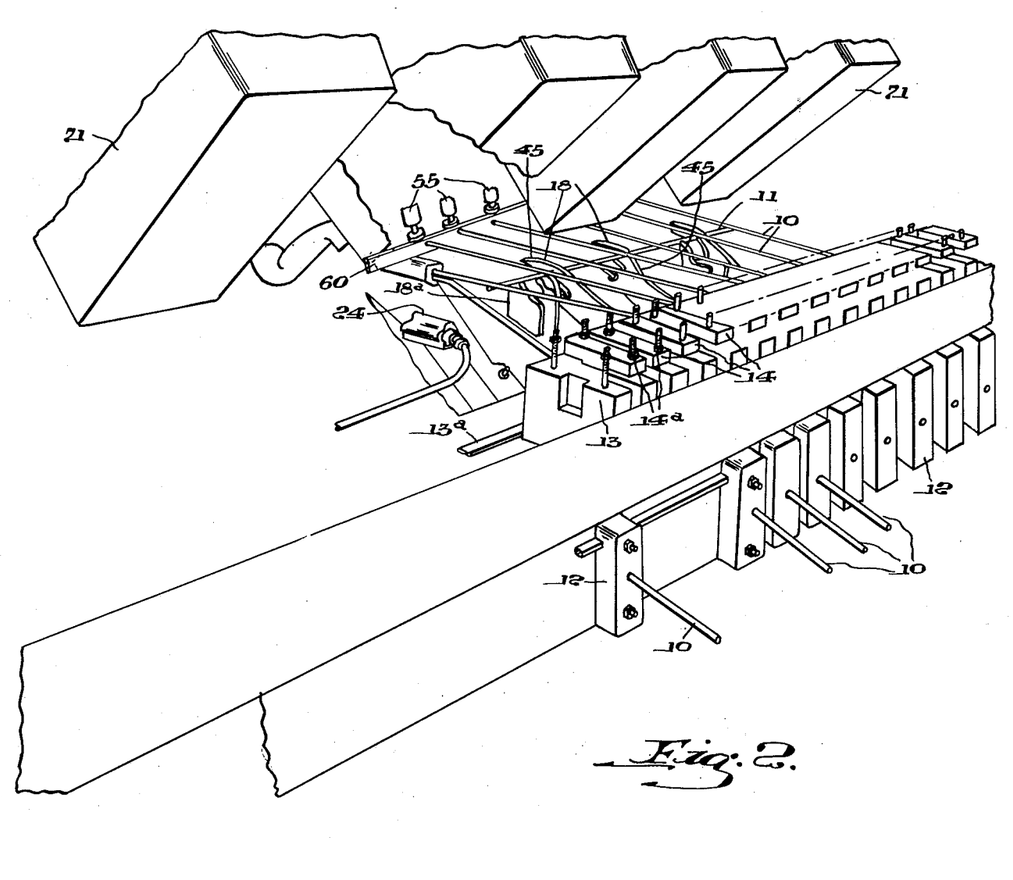
Fig. 2 is a fragmentary perspective view showing the rear or entrance to the welding machine.
Figure 20:
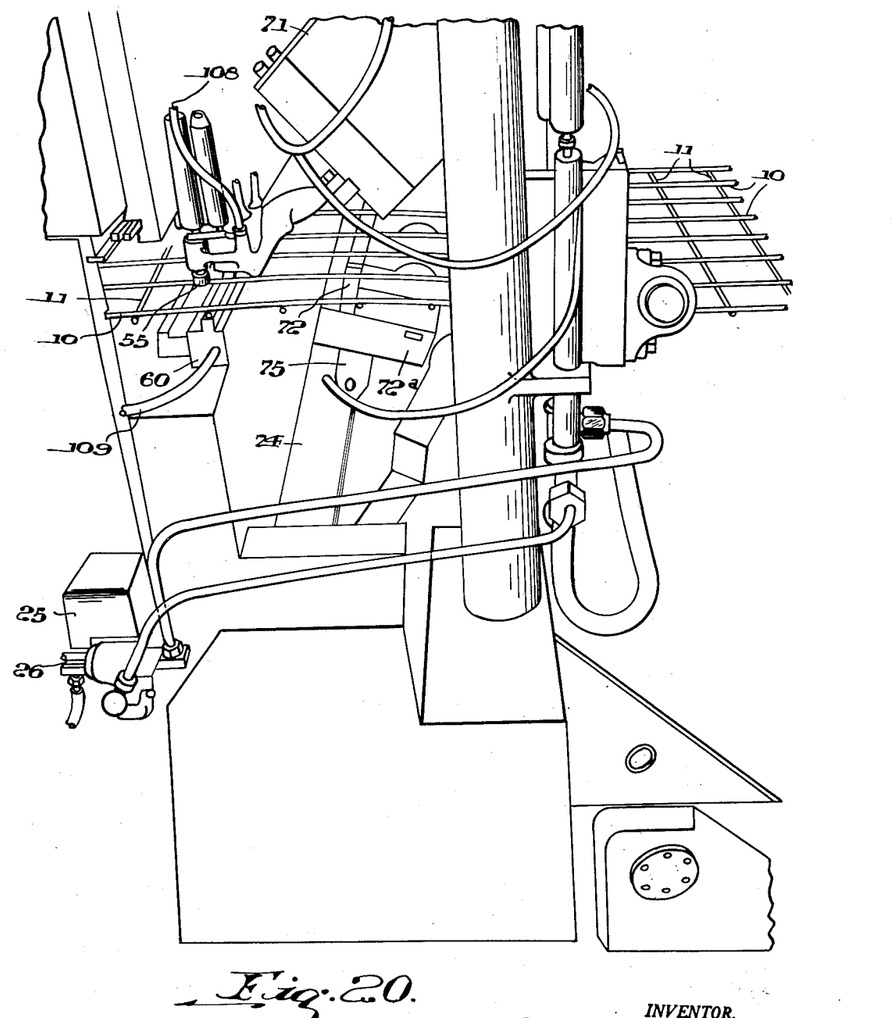
Fig. 20 is a perspective view showing one end of the indexing mechanism for advancing the welded mesh.

The electrodes 55 are arranged in two rows, the rear row being shown on Fig. 2 at the rear end of the machine, and the second row being shown in Fig. 20 near the middle of the machine. The electrodes in each row are staggered relative to the electrodes in the other row, so that the second-named row of electrodes will weld the transverse wires to those intermediate longitudinal wires that did not have the transverse wires welded thereto by the first row of electrodes. This staggered arrangement of the vertically-movable electrodes enables the longitudinal wires to be more closely spaced with respect to each other than would otherwise be possible.

Figure 22:
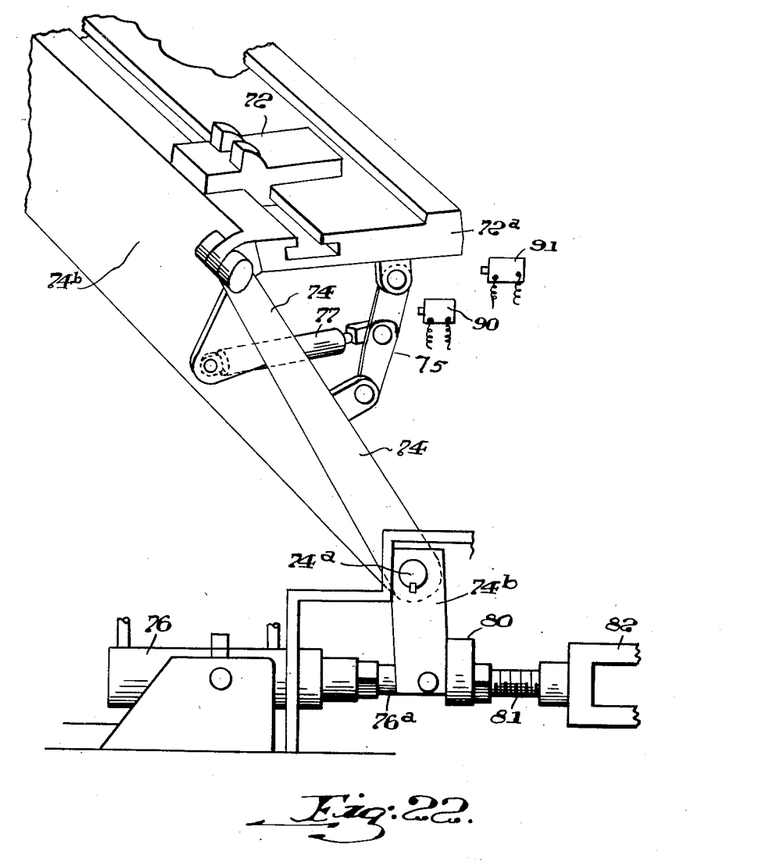
Fig. 22 is a detailed view showing portions of the apparatus of Fig. 21 that are obscured by the machine frame in Fig. 21.
Figure 23:
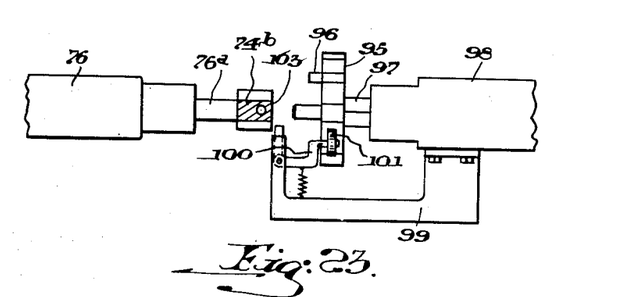
Fig. 23 is a plan view showing the manner in which the indexing mechanism of Fig. 22 may be modified to produce a mesh wherein successive transverse wires may be of different spacings.
Figure 24:
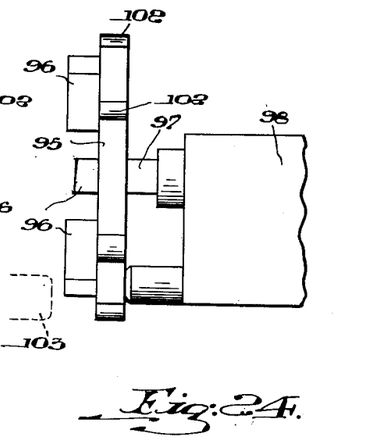
Fig. 24 is an edge view of the spacing disc of Fig. 23.

Each pair of electrodes is energized by a transformer 70 (Fig. 17) controlled by the timer 57 as above mentioned and contained within a box or casing 71. When the mesh represented by the wires 10 and 11 emerges from the second row of electrodes as indicated in Fig. 20, it is fed by indexing apparatus that comprises grab fingers 72 that are supported on a bracket 72a that is, in turn, pivotally supported by a rocker 74 and by toggle links 75. The rocker 74 is secured to a rock shaft 74a (Fig. 22) that is journaled in the framework of the machine. The shaft 74a is oscillated by an arm 74b and at its lower end has connection with the piston rod 76a of a hydraulic cylinder 76. The toggle links are operated by pistons of two cylinders 77 to raise and lower the bracket 72 and the grab fingers when they are being reciprocated forwardly and rearwardly by the piston rod 76a of the cylinder 76. The partial collapse of the toggles is provided at the end of a forward feeding stroke by the swinging arm 74, so as to move them down slightly and permit retractive movement thereof beneath the next transverse wire, pressure then again admitted to the cylinder 77 to straighten the toggles and cause the grab fingers to engage the next transverse wire.

When the pressure switch 56 has been moved to close the circuit to the electric timer and to reverse relay 58, it opens a circuit 84 (Fig. 28) on one side of a solenoid hydraulic 4-way valve 85 and closes a circuit 87 on one side of a solenoid-operated hydraulic 4-way valve 88. The valve 88, through the cylinder 77 and its piston, moves the toggle 75 to lower the bracket 72a, thereby lowering the grab hooks 72, so that they can pass backwardly underneath the transverse wires preparatory to another forward feeding movement. When the piston of cylinder 77 lowers these grab hooks, toggle 75 strikes a limit switch 90 which will close the circuit to the other side of the solenoid-operated valve 85 which will cause the piston in the cylinder 76 to swing the arm 74 in a clockwise direction, to thereby swing the bracket 72a backwardly toward the electrodes preparatory to a forward swinging movement.

The backward movement brings it into engagement with a limit switch 91 which closes the circuit to the other side of the valve 88, thereby causing the piston to move out of the cylinder 77 and straighten the toggle 75, thus raising the grab hooks into wire-engaging position. When the electronic timer has made the welds and released the pressure on the electrodes, the relays 58 will go back to their starting position and close the circuit through solenoid valve 85 to thereby effect movement of the piston rod 76 backwardly to swing the arm 74 counterclockwise, thus moving the grab hooks 72 and the wire mesh forwardly, until the movement is stopped by the abutment 81.

The distance which the mesh is advanced upon each operation of the hydraulic cylinder 76 is determined by the distance which the piston rod 76a is moved by the pressure in the cylinder 76. To this end, an adjustable stop 80 is provided that limits rearward movement of the piston rod 76a and hence the extent to which the grab fingers will be swung forwardly. This adjustment can be made by turning the rod 81 in block 82, for any desired transverse wire spacing as for example 2-inch; 4-inch and 6-inch, etc. Thus, if the machine is advanced by the grab fingers only two inches at each step, the transverse wires will be two inches apart, since there will be a transverse wire deposited at the rear end of the machine, during each pause of the feed movement of the machine.

The second row of electrodes is spaced forwardly of the first row of electrodes a distance which bears a multiple relationship of the adjustment of the grab fingers for different distances of advance. For example, if the forward electrodes are six inches ahead of the rear row, the adjustment for the step-by-step feed can be from one inch up to six inches, so that the forward electrodes will always be in position to complete the welding of a transverse wire. This does not, of course, result in half inch spacing, although such spacing could be provided for by the same means as above described.

Figure 1:
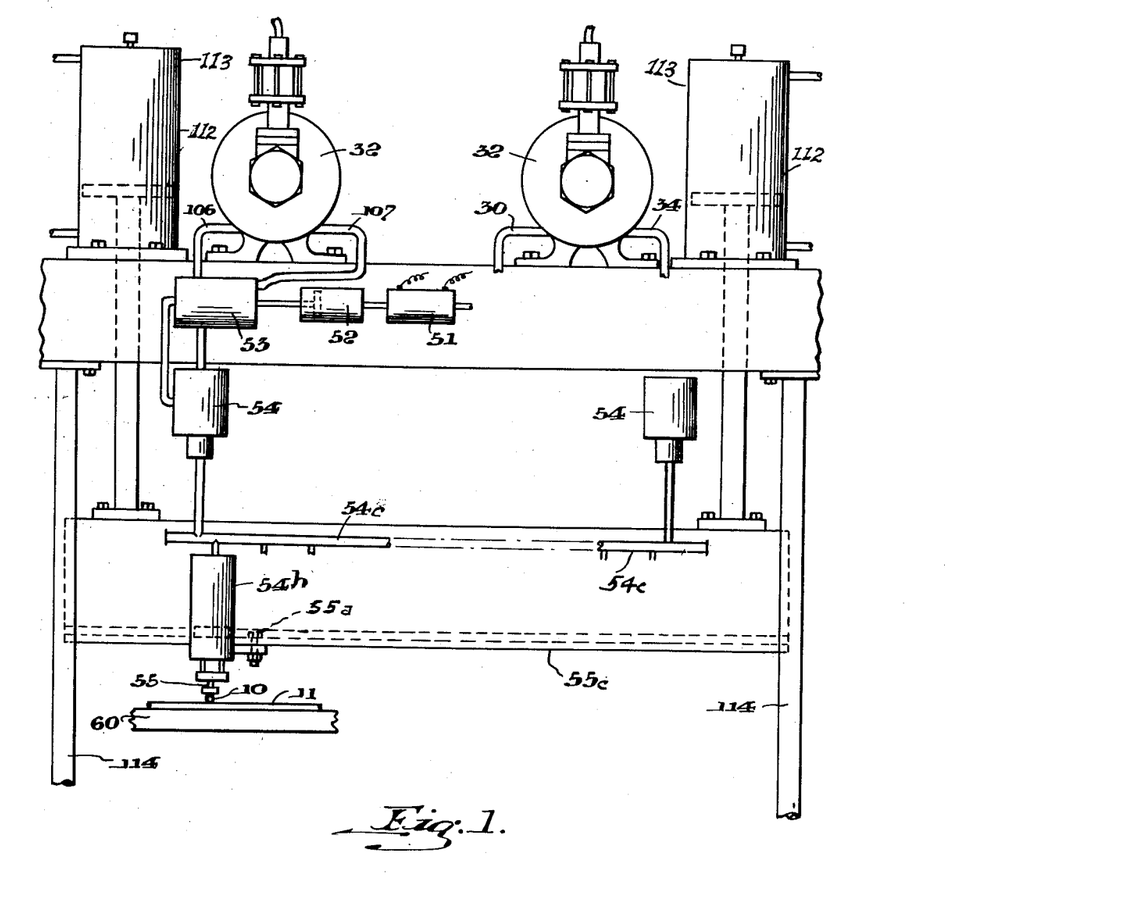
Figure 1 is an end view of the fabric-welding machine to which my invention is applied, but with various parts omitted for clarity.

The electrodes of each row are independently adjustable along their supporting bars or brackets 55c (Figs. 1 and 22) to vary the spacing of the longitudinal wires, the bars having T slots for bolts 55d. Similarly, the guide blocks 13 are adjustable along their grooved supporting rails 13a (Fig. 2), to change the spacing between the longitudinal wires.

Referring now to Figs. 23 to 26, I show a modification of the indexing mechanism whereby the mesh can be advanced in automatically variable increments, the extent of advance, of course, determining the spacing of the transverse wires, since one transverse wire will be fed into the rear end of the machine at each pause in advance of the mesh.

Figure 21:
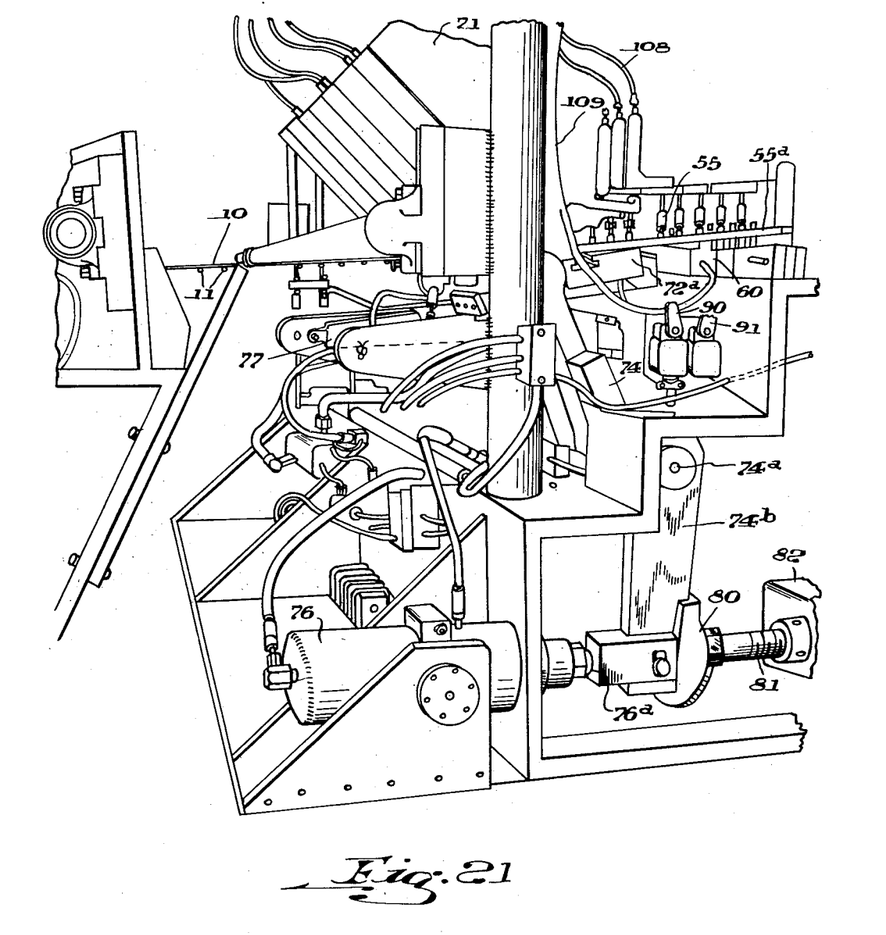
Fig. 21 is a view taken at the opposite side of the machine with respect to Fig. 20 and showing portions of the indexing mechanism and the operating cylinder therefor.
Figure 25:
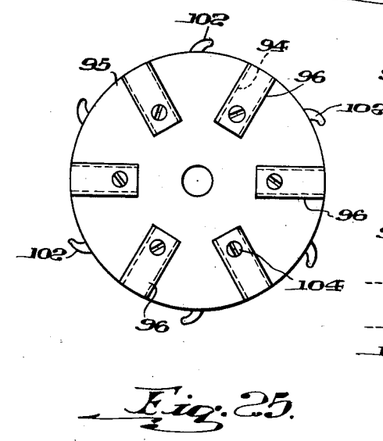
Fig. 25 is a face view of the disc.
Figure 26:
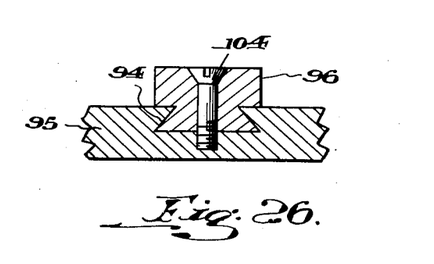
Fig. 26 shows the manner in which the spacing blocks may be removably held in the disc.

For example, it may be desired to advance the mesh only one inch, then two inches, then four inches, then five inches and then six inches, or it can be advanced a plurality of 2-inch spacings in succession, then 4-inch spacings, and then some other spacing. As shown in Fig. 25, dove-tail recesses 94 are provided in a rotating disc 95, for six abutment blocks 96 which may be of different thicknesses. These blocks may be of ½ inch thickness; 1-inch; 2-inch; 3-inch; 4-inch and 5-inch, or various other thicknesses, and they are interchangeable to secure, for example, a succession of two 2-inch stay wire spacings and one or two 4-inch spacings, and then 2-inch spacing, etc. The members 76, 76a and 74b correspond to the members 76, 76a and 74 of Fig. 21. The disc 95 is rotatably supported on a shaft 97 that is carried by a block 98 which corresponds to the block 82 of Fig. 21.

A bracket arm 99 is secured to the block 98 and carries an angular lever 100 of generally bell-crank form that carries on its outer end, a pivoted pawl 101 that will engage with ratchet teeth 102 on the periphery of the disc 95, so that each time the piston rod 76a is advanced, it will rock the lever 100 against its compression spring, to push the pawl such distance that the disc 95 will be given ⅙ of a revolution, thus bringing one of the blocks 96 into position to be engaged by the nose 103 of the plunger 76a.

Where uniform spacing is required, the blocks 96 will all be of the same thickness, and it will be understood that the distance by which the blocks 96 limit the rearward movement of the pistons 76a will determine the distance which the grab fingers advance the transverse wires and the mesh at each operation. The blocks 96 suitably have recesses to receive countersunk screws 104, to releasably hold them in their dove-tailed connections with the disc.

Cooling of the upper electrodes 55 and the electrode bars 60 is effected by hose pipes 108 and 109 (Figs. 18–20), connected to an ordinary water line, to effect circulation of cooling water through the electrodes in a manner well known in the art.

Figure 27:
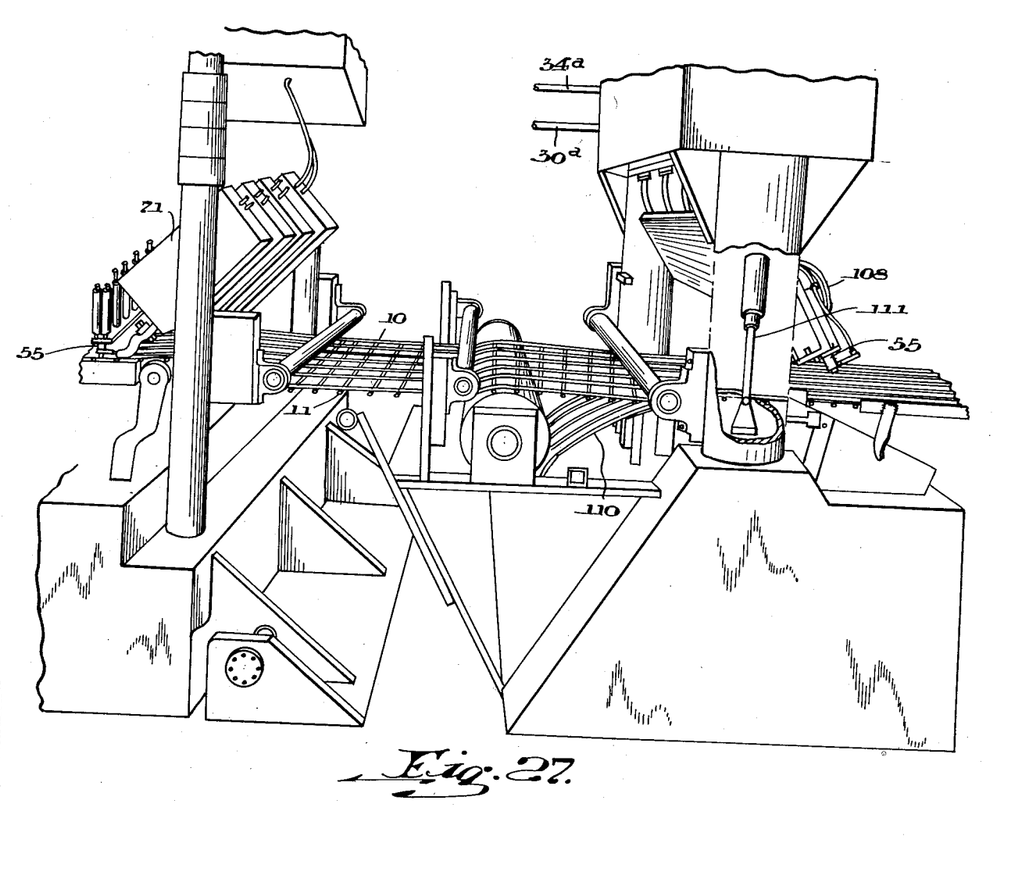
Fig. 27 is a side view of the machine showing the second bank of electrodes for welding the transverse wires beneath the longitudinal wires and a third bank of electrodes for welding reinforcing wires to the undersides of the transverse wires.

It may sometimes be desired to weld other longitudinal wire such as 110 (Fig. 27) to the undersides of the transverse wire 11, to stiffen the mesh either only at its edges or at various points across the entire width. To this end, a third bank of welding electrodes is provided as indicated generally at 111 in Fig. 27, some of the electrodes being swung to inoperative position as shown at the right hand end of the figure, where intermediate wires are not to be provided at the underside of the mesh.

As the transverse wires 11 are successively welded to the wires 110, the wires 110 will be advanced with the mesh by the action of the indexing mechanism heretofore described. Hydraulic fluid for the various hydraulic operating mechanisms and their associated control switches will be supplied from the pump 31, the pipes 30a and 34a (Fig. 28). Oil will be supplied from the pump 52a for moving the upper electrodes.

The manner in which the upper electrodes of this third bank are operated is the same as that in which the first and second rows of electrodes are operated. However, while an air valve such as 51, cylinders corresponding to cylinders 52 of Figs. 19 and 28, hydraulic valves 53 and boosters 54 are employed with this third bank of electrodes, they can be automatically operated in timed relation to the other movable electrodes by placing their solenoids or magnets in the various circuits of switches 50, 56, 58, etc., there being no need for direct electrical connection with the feeding mechanism at the rear end of the machine and the indexing mechanism.

While the electrodes are moved upwardly slightly after each welding operation, by their springs 55a, they can be raised much higher, for replacements, etc., by pistons 112 in cylinders 113. The piston rods are connected to the bars or cross heads 55c that carry the upper electrodes and are guided in channeled frame columns 114.

*Summary of strand wire feeding, stay wire feeding, welding and mesh-advancement*

Briefly stated, the applicant's invention principally involves the feeding of longitudinal wires, and strands for forming transverse stay wires crosswise of the longitudinal wires, the strand being automatically severed to form the stays and automatically fed, through the closing of a control switch by the forward end of this crosswise strand. The switch also effects energization of feeding mechanism that deposits the strands successively beneath vertically-movable electrodes, for welding to the longitudinal wires.

Also, a train of electro-magnets and hydraulic mechanisms are thereby automatically set into operation to move the electrodes against the crossed wires and to supply welding current, and to thereafter move the electrodes from the wires.

Still another train of mechanism is automatically set into motion by certain other parts of the apparatus, for the purpose of indexing or advancing the transverse wires and the longitudinal wire that have been welded thereto.

The transverse wires will be automatically spaced apart distances determined by the lengths of feeding strokes by the indexing mechanism, whether or not such strokes are all of the same length.

I claim as my invention:

1. The combination with an electric welding machine for wire fabric, that has upper and lower electrodes disposed transversely of the path of travel of wires through the machine, of means for advancing longitudinal wires step by step, means for forming and feeding a stay-forming strand crosswise of the longitudinal wires, comprising feed rolls that move a strand in successive steps across the longitudinal wires, a switch actuated by the forward end of the strand when the forward portion of the strand is in overlapping relation with the longitudinal wires, means controlled by the switch circuit for interrupting the feeding action of the rolls, a shear controlled by the switch circuit, for cutting the strand to sever said forward portion therefrom, to form a stay wire, a feeding device controlled by the switch circuit, for advancing the stay wire along the longitudinal wires, into welding position between the upper and lower electrodes, means actuated by said feeding device at the limit of its forward movement, for operating the electrodes and rendering them active to grip the stay wires and weld them to the longitudinal wires, and means for automatically returning the feeding device to its retracted position, and for simultaneously setting the feed rolls into operation.

2. Apparatus as recited in claim 1 wherein, the feeding device is in the form of a rocker that is oscillated in a direction generally parallel to the longitudinal wires and is automatically lowered to a plane below the line of stay wire feed, during its retractive movement.

3. Apparatus as recited in claim 1, wherein, indexing mechanism for advancing the welded wires is moved into and out of engagement with successive stay wires, and reciprocated generally parallel to the longitudinal wires, under control of the stay wire feeding and forming apparatus.

4. The combination with a machine for welding wire fabric, that has opposed sets of electrodes arranged transversely of the path of travel through the machine, of guide means for directing longitudinal wires between the electrodes, a feeding device for depositing stay wires in crossed relation to the longitudinal wires, between the sets of electrodes, reciprocably movable indexing mechanism for advancing the welded wires, a series of stop devices movable in recurring cycles for adjustably limiting the said advance to various ranges during each cycle of said series and means for automatically feeding a stay wire into welding position upon each operation of the indexing mechanism, at all adjusted limits of said advance movements, whereby the stay wire spacings will be determined by the adjustment of the indexing mechanism.

5. Apparatus as recited in claim 4, wherein the electrodes are arranged in a plurality of transverse rows and there is a multiple relationship in spacing, as between the said rows and the said ranges of movement, whereby some transversely alined welds will be welded by one row of electrodes and other welds by other transversely alined electrodes.

6. Apparatus as recited in claim 5, wherein the electrodes of one row are staggered relatively to the electrodes of another row.

7. The combination with an electric welding machine for wire fabrics, that has upper and lower electrodes disposed transversely of the path of travel of wires through the machine, of means for guiding longitudinal wires between the electrodes, means for feeding stay wires in cross-wise relation to the longitudinal wires, a switch operated by the stay wires thus fed, an electrically operated feeding device reciprocable in a direction generally parallel to the longitudinal wires, for depositing the stay wires in welding position between the electrodes, means actuated during retractive movement of the reciprocable member, that operates the feeding device to feed another stay wire, a switch operated by the reciprocating device at its forward limited movement, that controls a circuit for actuating the electrodes to effect a welding operation, an electrically-controlled indexing device that engages the stay wires after they have been welded to the longitudinal wires by the electrodes and is reciprocable longitudinally of the mesh to advance the welded mesh and means for controlling the circuit of the indexing device in timed relation to movements of the electrodes.

References Cited in the file of this patent

UNITED STATES PATENTS

| | | |
|---|---|---|
| 1,901,477 | Southwick | Mar. 14, 1933 |
| 2,497,260 | Griesemer | Feb. 14, 1950 |